(12) United States Patent
Schwartz et al.

(10) Patent No.: US 8,903,833 B2
(45) Date of Patent: Dec. 2, 2014

(54) OBJECT IDENTIFICATION BY ELECTOR

(75) Inventors: Dror Schwartz, Holon (IL); Amir Kessner, Ramat-Gan (IL); Arnon Mathias, Kfar-Sava (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 661 days.

(21) Appl. No.: 12/794,621

(22) Filed: Jun. 4, 2010

(65) Prior Publication Data
US 2011/0302173 A1   Dec. 8, 2011

(51) Int. Cl.
*G06F 17/30* (2006.01)
*G06F 7/00* (2006.01)
*G06F 9/52* (2006.01)

(52) U.S. Cl.
CPC ............ *G06F 9/52* (2013.01); *G06F 17/30864* (2013.01); *G06F 17/30675* (2013.01); *G06F 17/30882* (2013.01); *G06F 17/30867* (2013.01)
USPC .......................................................... 707/748

(58) Field of Classification Search
USPC .......................................... 707/755, 758, 802
See application file for complete search history.

(56) References Cited

U.S. PATENT DOCUMENTS

| | | | |
|---|---|---|---|
| 7,814,470 B2 * | 10/2010 | Mamou et al. | 717/162 |
| 2004/0172253 A1 | 9/2004 | Singh | |
| 2006/0253742 A1 | 11/2006 | Elenburg et al. | |
| 2008/0092119 A1 | 4/2008 | Sweis | |

OTHER PUBLICATIONS

HP OpenView Integration Series Distributed Management Developer's Guide HP 9000 Series and Sun Systems HP Part No. J1064-90019 Printed in U.S.A. Apr. 1996.*

* cited by examiner

*Primary Examiner* — Kuen Lu

(57) ABSTRACT

Techniques for identifying an object are disclosed herein. In one embodiment, an object identification system includes a reference to an object acted on at a first time, an elector, and a elector manager. The elector is configured to provide an appraisal, at a second time, of whether a candidate object is the objected acted on. The elector manager is configured to determine whether the candidate object is object acted on based on a value of the appraisal.

20 Claims, 3 Drawing Sheets

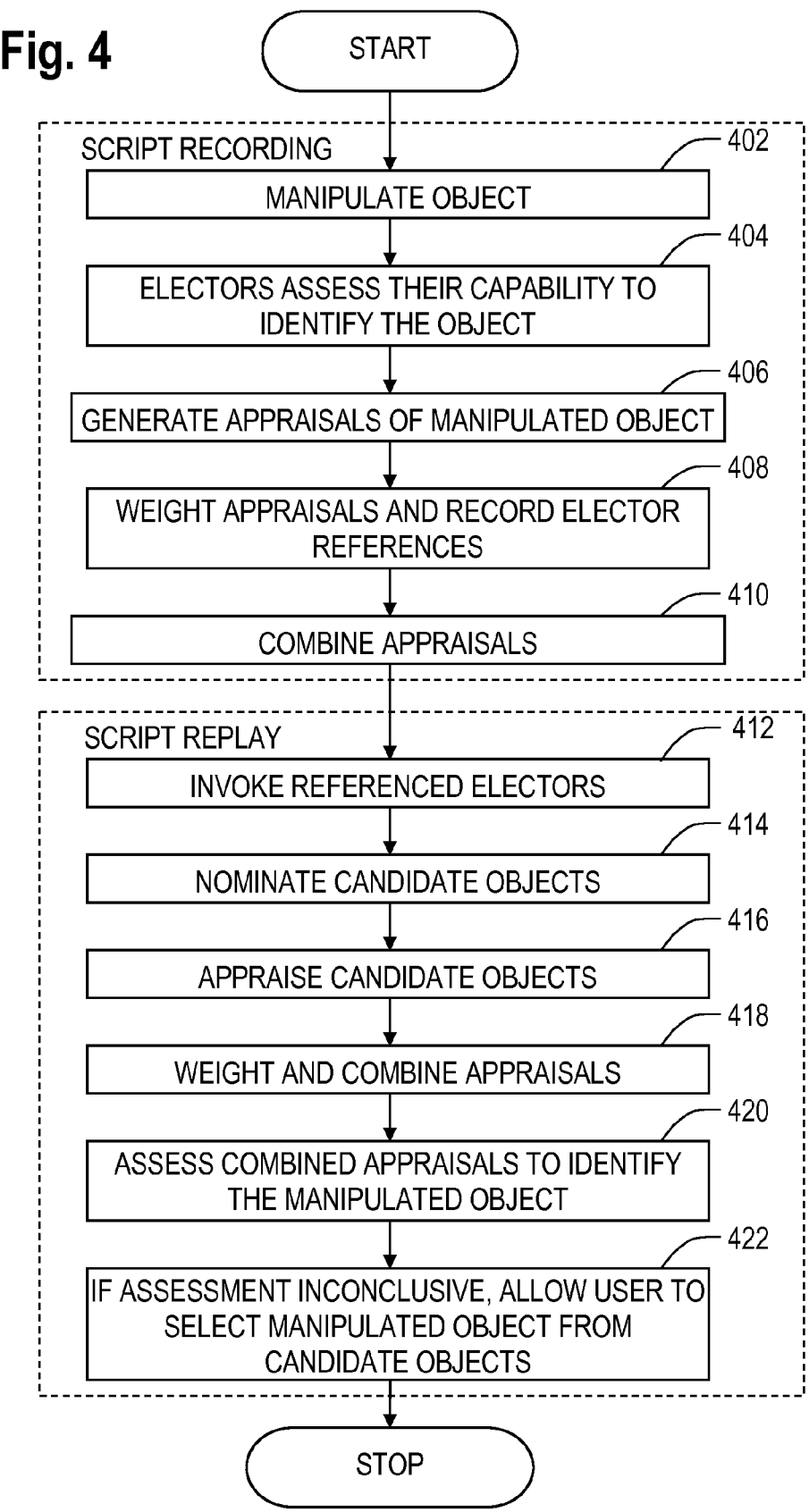

OBJECT IDENTIFICATION BY ELECTOR

BACKGROUND

In web applications, web pages and other documents are often represented using the document object model ("DOM") or a similar representation. DOM represents a document as a treelike hierarchy of object nodes that facilitates program and script modification of the document. In order to manipulate an object, a script or program must first locate the object to be manipulated.

BRIEF DESCRIPTION OF THE DRAWINGS

For a detailed description of exemplary embodiments of the invention, reference will now be made to the accompanying drawings in which:

FIG. 4 shows a flow diagram for a method of identifying objects to be operated on by a script in accordance with various embodiments.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Further, the term "software" includes any executable code capable of running on a processor, regardless of the media used to store the software. Thus, code stored in memory (e.g., non-volatile memory), and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In web applications, many objects have no distinguishing properties. For example, any number of different objects may be represented by DIV or SPAN tags thereby impeding tag based identification of a particular target object. Traditional object identifying properties, such as an object name, may be dynamically generated, and therefore change over time or be assigned to other objects. Consequently, identifying, at a later time, an object acted on by a program at an earlier time may be problematic. Such identification may be necessary, for example, to replicate the operations previously performed on the object. Embodiments of the present disclosure provide a novel mechanism for locating objects acted on at script creation (i.e., script recording time) at a later point in time, such as when the script is executed (i.e., script replay time). Embodiments provide object identification/location capability through "electors." Electors appraise (e.g., vote for or against) candidate objects as being a desired recording time target object.

Figure 1:
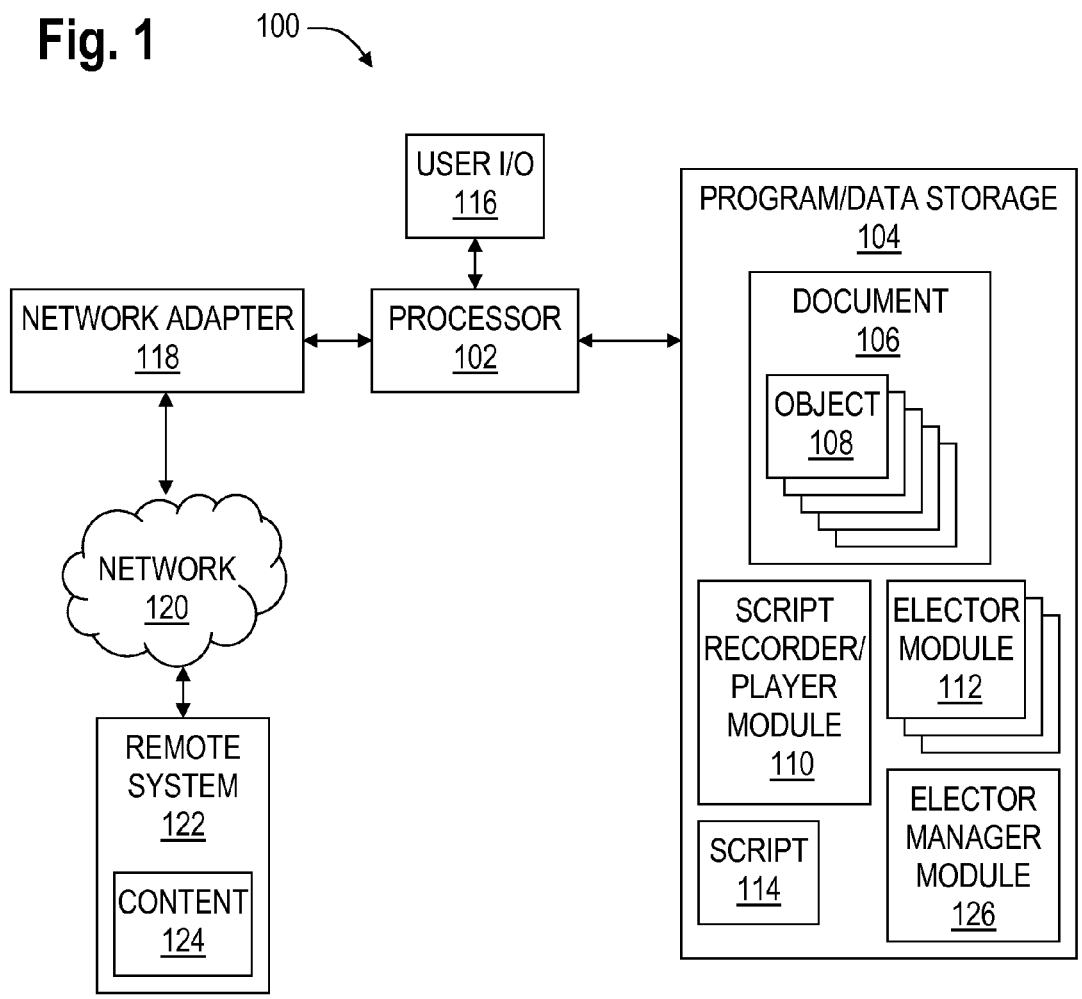
FIG. 1 shows a block diagram of a system including elector-based object identification in accordance with various embodiments.

FIG. 1 shows a block diagram of a system 100 including elector-based object identification in accordance with various embodiments. The system 100 includes program/data storage 104 and at least one processor 102. Some embodiments of the system 100 also include a network adapter 118 and user I/O devices 116. These elements of the system 100 may be embodied in a computer as is known in the art. Desktop computers, server computers, notebook computers, handheld computers, etc. are exemplary computers that may suitably embody components of the system 100.

The processor 102 is configured to execute instructions read from a computer readable medium, and may, for example, be a general-purpose processor, digital signal processor, microcontroller, etc. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

The program/data storage 104 is a computer-readable medium coupled to and accessible to the processor 102. The storage 104 may be volatile or non-volatile semiconductor memory (e.g., FLASH memory, dynamic random access memory, etc.), magnetic storage (e.g., hard disk, etc.), optical storage (e.g., compact disc, digital versatile disc, etc.), or other storage technology. Various programs executable by the processor 102, and data structures manipulatable by the processor 102 may be stored in the storage 104.

User I/O devices 116 coupled to the processor 102 may include various devices employed by a user to interact with the processor 102 based on programming executed thereby. Exemplary user I/O devices 116 include video display devices, such as liquid crystal, cathode ray, plasma, organic light emitting diode, vacuum fluorescent, electroluminescent, electronic paper or other appropriate display panels for providing information to the user. Keyboards, touchscreens, and pointing devices (e.g., a mouse, trackball, light pen, etc.) are examples of devices includable in the I/O devices 116 for providing user input to the processor 102.

A network adapter 118 is coupled to the processor 102 to allow the processor 102 to communicate with a remote system 122 via the network 120, and to, for example, acquire content 124 (e.g., web pages, applications, images, audio, etc.) from the remote system 122. The network adapter 118 may allow connection to a wired or wireless network, for example, in accordance with IEEE 802.11, IEEE 802.3, Ethernet, a cellular network, etc. The network 120 may comprise any available computer networking arrangement, for example, any one or a combination of a local area network ("LAN"), a wide area network ("WAN"), a metropolitan area network ("MAN"), the internet, etc. Further, the network 120 may comprise any of a variety of networking technologies, for example, wired, wireless, or optical techniques may be employed. Accordingly, the remote system 122 is not restricted to any particular location or proximity to the processor 102.

Referring again to the program/data storage 104, various data and program modules are shown stored therein. The document 106 may be, for example a web page or application, and includes one or more objects 108 that may be acted on or manipulated during web page operations. The document 106 may also include executable programming. The objects 108 may include any of a variety of structures that include modifiable data and/or programming that operates on the data. The data may describe, for example, a displayable element of web page wherein the displayable element is modifiable or capable of performing an operation in accordance with user input. As explained above, identification of an object 108 acted on by an application at one time, so that a corresponding object can be acted can be acted on during a subsequent invocation of the application, can be problematic. This is especially true, if the object and/or the application are subject to change between invocations.

Embodiments of the system 100 employ electors modules 112 in conjunction with an elector manager module 126 to configure the processor 102 to identify previously manipulated objects, and to thereby overcome ambiguity in object selection. An elector module 112 can include software programming executed by the processor 102 that provides an appraisal (a rating or valuation) of the objects 108 to determine which of the objects 108 is likely to correspond to an object 108 previously manipulated. Different electors modules 112 may be configured for identification of an object 108 based different object attributes. A first elector module 112 may be configured to identify an object 108 based on the tag name assigned to an acted on object 108. A second elector module 112 may be configured to identify an object 108 based on the location of the object 108 in the DOM (e.g., a DOM). A third elector module 112 may be configured to identify an object 108 based on the display location of the object 108. A fourth elector module 112 may be configured to identify an object 108 based on display attributes (e.g., size, color, etc.) of the object 108. A fifth elector module 112 may be configured to identify an object 108 based on a relationship of the object 108 to different object 108 that may in some cases be easier to locate. The aforementioned object attributes used by an elector module 112 are purely exemplary, and embodiments of an elector module 112 may refer to any object attribute to identify an object 108. A single elector module 112 may not positively identify an object 108. Therefore, some embodiments employ a plurality of elector modules 112 in combination to locate a previously manipulated object 108.

The elector manager module 126 may include software programming executed by the processor 102. The elector manager module 126 configures the processor 102 to combine appraisal values provided via the elector modules 112 relative to a given object 108 and determines, based on the combined appraisal, whether the given object 108 corresponds to a previously manipulated object 108. For example, in some embodiments the elector manager module 126 may deem a given object 108 to correspond to a previously manipulated object 108 if the combined appraisal value for the given object exceeds a predetermined threshold value.

The ability to locate a previously acted on object 108 at a later time is useful when recording operations performed on the document 106 for subsequent playback. The script recorder/player module 110 can, when executed by the processor 102, monitor user and other system 100 operations affecting the document 106 and objects 108, and record those operations to generate the script 114. The script recorder/player module 110 can also execute the script 114 to replicate the operations previously performed. In some embodiments, the script 114 includes objects representing the operations performed on the document 106 as the script was recorded and objects referencing the elector modules 112 used to identify each object 108 acted on.

As the script recorder/player module 110 executes to monitor system 100 operations affecting the document 106, the script recorder/player module 110 identifies operations that act on the objects 108. When an operation acting on an object 108 is identified, the electors modules 112 are invoked to allow each elector module 112 to determine whether it is applicable to identifying the object 108 acted on. For example, some elector modules 112 may be applicable to some object types (e.g., buttons) but not to other object types (e.g., links). Each elector module 112 determined to be applicable to identifying the object 108 acted on, collects information required to identify the object 108, and provides an appraisal or vote as to the object's identity. In some embodiments that appraisal is a value ranging from −1 to +1 where −1 indicates a total mismatch, 1 indicates a full match, and 0 indicates no appraisal. Appraisals are weighted in accordance with the perceived value of the elector module 112 providing the appraisal in identifying the manipulated object 108, and combined via the elector manager module 126 to generate a combined appraisal or score that may provide a baseline for comparison when objects are identified during script replay. References to the participating elector modules 112 are stored so the appropriate elector modules 112 can be invoked on script replay.

In some embodiments, in addition to appraising the acted on object 108, the participating elector modules 112 also provide recording time appraisals of all other objects 108 in the document 106. The appraisals for each object 108 are weighted and combined as described above. The maximum combined appraisal value for the other objects 108 may serve as a minimum object 108 identification score at script 114 replay. The difference between this minimum score and the score for the object 108 acted on may be indicative of a level of uniqueness expected in identifying the object 108 acted on.

In some embodiments, the elector manager module 126 can determine at recording time that gathered information concerning an object 108 acted on is insufficient to identify the object 108. Such a determination may be based on, for example, fewer than a selected minimum number of elector modules 112 providing an appraisal value, or a combined appraisal being below a predetermined threshold. Consequently, the elector manager module 126 may configure the processor 102 to search for another object 108 to serve as a context for or reference to the object 108 acted on. A context object 108 selected by the elector manager module 126 may be more easily identifiable than the object 108 acted on, and consequently, the object 108 acted on and/or the combination of the object acted on 108 and the context object 108 may be easier for elector modules 112 to identify than the object 108 acted on alone. Embodiments of the elector manager module 126 select multiple context objects 108 and such selection can be recursive, wherein a second context object 108 is selected to reference a first context object, etc.

The script recorder/player module 110 can replay the previously recorded script 114 to replicate the record time operations performed on the document 106. When the script 114 calls for an object 108 to be acted on, the set of elector modules 112 selected at record time to identify the object 108 are invoked. At least some of the invoked elector modules 112 nominate objects 108 to serve as candidates for the object 108 acted on at record time. The invoked elector modules 112 provide appraisals for each candidate object 108. The appraisals of each candidate object 108 are weighted and combined (e.g., added) via the elector manager module 126 to form a score that determines a candidate's likelihood of being the object 108 acted on at record time.

In some embodiments, the candidate object 108 with the highest score is selected as being the object 108 acted on at record time. However, if the highest score is less than a predetermined threshold value, or the difference between the highest and next-highest scores is less than a predetermined amount, the result may be determined to be uncertain and some of the candidate objects 108 may be presented to the user for selection. In some embodiments, a candidate object 108 is withdrawn from consideration if an elector module 112 returns a total mismatch appraisal. In some embodiments, appraisal of the candidate objects 108 stops when a candidate object 108 accumulates a score in excess of a predetermined threshold value. When a candidate object 108 has been identified as the object 108 manipulated at record time, the script recorder/player module 110 acts on the object in accordance with the script 114.

Due to the dynamic nature of web applications, an object 108 acted on at record time, can change between application invocations. Consequently, in some embodiments, elector modules 112 update previously acquired data concerning an object 108 acted on with more current and/or more correct data. Updating may be manually initiated by a user (e.g., when object identification fails), or automatically initiated by the elector manager module 126 (e.g., when identification succeeds with a combined appraisal value lower than a predetermined threshold value). For example, a link object 108 may include a dynamic portion and a static portion. An elector module 112 may determine what portions of the link object are static and what portions are dynamic and update its data related to the object 108 accordingly. If changes to the link object 108 are excessive, the elector module 112 may withdraw from appraisal of the object 108.

Figure 2:
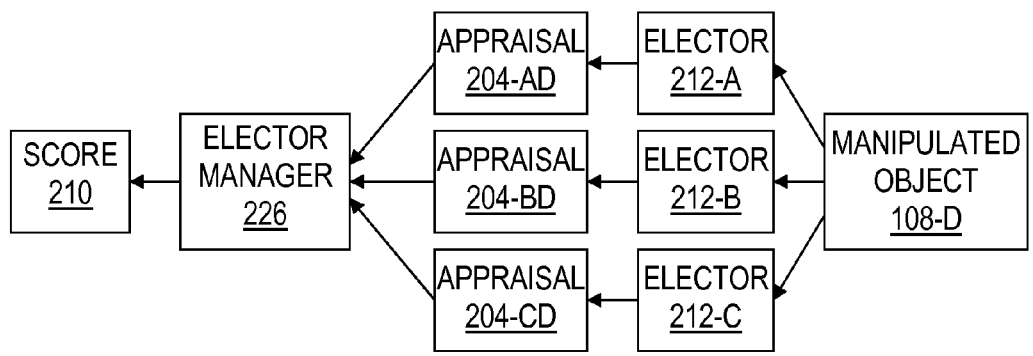
FIG. 2 shows a block diagram of elector application to a manipulated object at script recording time in accordance with various embodiments.

FIG. 2 shows a block diagram of a system employing electors 212-A, B, C application to a manipulated object 108-D at script 114 recording time in accordance with various embodiments. In FIG. 2, three electors 212-A, 212-B, and 212-C have chosen to participate in the appraisal of the manipulated object 108-D. Each elector 212-A, B, C provides a corresponding appraisal 204-AD, BD, CD of the object 108-D. The appraisals 204-AD, BD, CD are based on an evaluation of the manipulated object in correspondence with object attributes targeted by the respective electors 212-A, B, C. The appraisals 204-AD, BD, CD are weighted and combined by the elector manager 226 to generate a score 210 for the manipulated object 108-D. The score 210 and references to the electors 212-A, B, C are stored for script replay. In some embodiments, the elector 212-A, B, C references are stored in accordance with the appraisal values 204-A, B, C (e.g., storage sequence determined by appraisal value).

Figure 3:
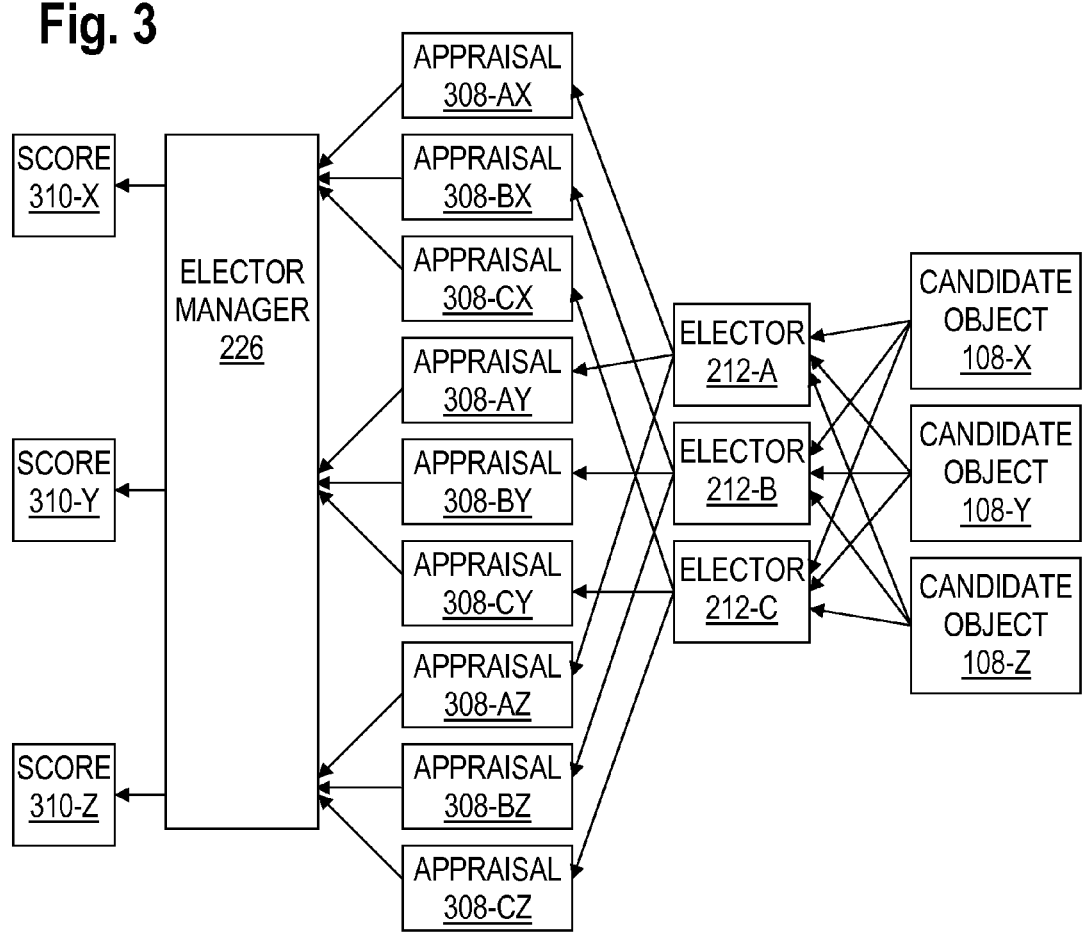
FIG. 3 shows a block diagram of elector application to candidate objects at script replay time in accordance with various embodiments.

FIG. 3 shows a block diagram of a system applying electors 212-A, B, C application to candidate objects 108-X, Y, Z at script replay time in accordance with various embodiments. The electors 212-A, B, C were selected to participate in object identification when the object 108-D (FIG. 2) was manipulated as the script 114 was recorded. In FIG. 3, the electors 212-A, B, C have been invoked to identify the object 108-D to be manipulated by replay of the script 114. Each of electors 212-A, B, C has respectively nominated a candidate object 108-X, Y, Z as possibly corresponding to the object 108-D. Different electors 212 may nominate different numbers of candidate objects 108. Some electors 212 may nominate no candidate objects 108, and other electors 212 may nominate multiple candidate objects 108.

Each elector 212-A, B, C generates an appraisal 308 corresponding to each candidate object 108. Elector 212-A generates appraisals 308-AX, AY, AZ corresponding to the candidate objects 108-X, Y, Z. Similarly, elector 212-B generates appraisals 308-BX, BY, BZ, and elector 212-C generates appraisals 308-CX, CY, CZ each corresponding to the respective candidate objects 108-X, Y, Z. The appraisals 308 corresponding to each candidate object 108 are weighted, and combined by the elector manager 226 to generate scores 310-X, Y, Z for each respective candidate object 108-X, Y, Z. The candidate object 108-X, Y, Z corresponding to the highest of scores 310-X, Y, Z may be selected as being the object 108 acted on at recording time.

Embodiments of the elector 212 and the elector manager 226 can be implemented as dedicated circuitry and/or one or more processors programmed to provide the functionality described herein.

FIG. 4 shows a flow diagram for a method of identifying objects to be operated on by a script 114 in accordance with various embodiments. Though depicted sequentially as a matter of convenience, at least some of the actions shown can be performed in a different order and/or performed in parallel. Additionally, some embodiments may perform only some of the actions shown. In some embodiments, the operations of FIG. 4, as well as other operations described herein, can be implemented as instructions stored in a computer readable medium (e.g., storage 104) and executed by one or more processors (e.g., processor 102) or computers.

In FIG. 4, blocks 402-408 represent operations performed at a time during which operations on document 106 are being recorded in a script 114. In block 402, an object 108 associated with the document 106 is manipulated. The manipulation may be due, for example, to user interaction with the object 108 via a user I/O device 116. Examples of object 108 manipulations include clicking a link, pressing a button, changing a control setting, etc.

In block 404, in response to the manipulation of the object 108, each elector 212 assesses its capability to identify the object 108 acted on. Some electors 212 may not be configured to identify an object of the type of the object 108 acted on. Such electors 212 can decline to offer an appraisal.

In block 406, each elector 212 participating in object 108 identification acquires information regarding the manipulated object 108 and generates an appraisal 204. In some embodiments, an appraisal 204 may range from −1 (total mismatch) to +1 (full match) with 0 indicating no appraisal.

In block 408, each elector may determine its value in identifying the manipulated object 108, and apply a weight to the generated appraisal value 204 in accordance with its value. The weighted appraisal values 204 and references to the appraising electors 212 are stored so the electors 212 can be invoked at replay time. Stored elector references may be stored in accordance with the weighted appraisal values.

In block 410, the elector manager 226 combines the weighted appraisals 204 and stores the resultant value 210 for comparison against scores 310 generated during replay time object 108 identification.

In some embodiments, subsequent changes to the manipulated object 108 while recording are detected and the electors 212 previously selected to identify the object 108 are re-invoked to provide a new appraisal.

Blocks 412-422 of FIG. 4 represent operations performed in at a time during which the script 114 is being replayed to replicate operations performed on the document 106 at recording time. In block 412, the script 114 is being executed and a script 114 operation dictates that an object 108 be acted upon. In order to locate the object 108 acted on at recording time, the electors 212 opting to identify the object 108 are invoked via the stored elector references.

In block 414, the activated electors 212 parse the document 106 to identify objects 108 for nomination as candidates for being the object 108 acted on at record time. Each elector 212 nominating a candidate object 108 selects the candidate object based on particular object attributes used by the elector 212 to identify objects. For example, an elector 212 that uses object tags to identify objects may nominate objects 108 having the same tag as the manipulated object 108 to serve as candidate objects. Some electors may not nominate candidate objects.

In block 416, each invoked elector 212 provides an appraisal value 308 for each nominated candidate object 108. Each elector 212 evaluates a candidate based on object identification criteria supported by the elector 212 (e.g., tag, name, location, etc).

In block 418, the each elector 212 weights it appraisal values 308. Weighting may be, for example, in accordance with the value of the elector 212 in identifying the object 108 acted on at record time. The weighted appraisal values for each candidate object 108 are combined (e.g., added) by the elector manager 226 to form combined appraisals (i.e., scores) 310 for each candidate object 108.

In block 420, the combined appraisals 310 are assessed to determine which of the candidate objects 108 is most likely to be the object 108 acted on at record time. In some embodiments, the candidate object 108 with the highest combined appraisal 308 is selected as being the object manipulated at record time.

If the highest combined appraisal 308 is below a predetermined threshold value, or the two highest combined appraisals differ by less than a predetermined amount, then the assessment may be inclusive. In block 422, if the assessment is deemed inconclusive, then a user may be provided with a set of candidate objects 108 from which to select the object 108 acted on at record time. In some embodiments, a set of candidate objects 108 having high appraisal values 308 may be presented to the user. For example, the N candidate objects having the highest combined appraisal values 308 can be presented on a display device of user I/O 116 for user selection.

After a candidate object 108 is identified as being the object 108 acted on at recording time, the operations specified in the script 114 are performed on the object 108.

The above discussion is meant to be illustrative of the principles and various embodiments of the present invention. Numerous variations and modifications will become apparent to those skilled in the art once the above disclosure is fully appreciated. For example, while embodiments have been described by reference to recording and replaying a script, those skilled in the art will understand that embodiments are applicable to other situations where identification of an object is problematic. It is intended that the following claims be interpreted to embrace all such variations and modifications.

What is claimed is:

1. An object identification system, comprising:
    a first elector, comprising a processor configured to:
        determine value of the first elector for assessing whether a candidate object of a particular type is an object acted on at a first time; and
        provide an appraisal, at a second time, of whether the candidate object is the object acted on; and
    an elector manager, comprising the processor configured to determine whether the candidate object is the object acted on based on a comparison of a value of the appraisal, in combination with other appraisals, to a threshold value.

2. The object identification system of claim 1, wherein the first elector is configured to determine whether to provide an appraisal based on an assessment, by the first elector, of whether the first elector is capable of identifying the object acted on.

3. The object identification system of claim 1, wherein the first elector is configured to store, at the first time, information used to provide the appraisal at the second time.

4. The object identification system of claim 1, further comprising a second elector configured to identify an object as being the candidate object for appraisal by the first elector.

5. The object identification system of claim 4, wherein the first and second electors are each configured to provide a separate appraisal of the candidate object independently of the other, and based on a different attribute of the candidate object.

6. The object identification system of claim 4, wherein the appraisal of the first elector is given greater weight in identifying the candidate object as the object acted on than is an appraisal of the candidate object provided by the second elector.

7. The object identification system of claim 1, wherein the first elector is configured to appraise the candidate object based on a relationship between the candidate object and a different object.

8. The object identification system of claim 1, further comprising a user selection mechanism configured to allow a user to select the object acted on from a plurality of candidate objects responsive to a value of the appraisal being insufficient to identify the object acted on.

9. The object identification system of claim 1, wherein the elector manager is configured to:
    combine a plurality of appraisal values of the object acted on generated at the first time to provide a first score;
    combine a plurality of appraisal values generated for the candidate object at the second time to generate a second score; and
    determine whether the candidate object corresponds to the object acted on by comparing the first score to the second score.

10. The object identification system of claim 1, wherein the system stores an identification of the elector at the first time, and invokes the elector based on the stored identification at the second time.

11. A method, comprising:
    manipulating at a first time, by one or more processors, an object of an application executed by the processor;
    identifying, by the one or more processors, responsive to the manipulating, a first elector to identify the manipulated object;
    determining value of the first elector for assessing whether a candidate object of a particular type is the manipulated object;
    providing, by the one or more processors, at a second time, via the first elector, an appraisal of whether the candidate object is the manipulated object;
    weighting the appraisal in accordance with the determined value of the first elector; and determining whether the candidate object is the manipulated object based on a comparison of a combined appraisal that includes the weighted appraisal to a threshold value.

12. The method of claim 11, further comprising determining whether a value of the appraisal identifies the candidate object as being the object manipulated.

13. The method of claim 11, further comprising:
identifying a second elector to identify the manipulated object;
determining value of the second elector for assessing whether the candidate object is the manipulated object;
providing, via the second elector, an appraisal of whether the candidate object is the manipulated object.

14. The method of claim 13, wherein the first elector and the second elector are each configured to provide a separate appraisal of the candidate object independently of the other, and based on a different attributes of the candidate object.

15. The method of claim 14, further comprising:
weighting the second appraisal in accordance with the determined value of the second elector;
combining the weighted appraisals; and
determining whether the combined appraisal identifies the candidate object as being the manipulated object by comparing the combined appraisal to the threshold value.

16. A non-transitory computer readable medium encoded with a computer program that when executed causes one or more computers to:
identify, responsive to manipulation of an object of an application program executing on the one or more computers at a first time, a first elector to identify the manipulated object;
produce, via the first elector, an indication of value of the elector for assessing whether a given object of a particular type is the manipulated object;
provide, at a second time, via the first elector, an appraisal of whether a candidate object selected at the second time is the object manipulated at the first time; and
determine whether the candidate object is the manipulated object based on a comparison of the appraisal, in combination with other appraisals, to a threshold value.

17. The computer readable medium of claim 16 further encoded with a computer program to determine whether the value of the appraisal identifies the candidate object as being the object acted on.

18. The computer readable medium of claim 16 further encoded with a computer program to identify the candidate object via a second elector prior to providing the appraisal via the first elector.

19. The computer readable medium of claim 18 further encoded with a computer program to provide an appraisal of the candidate object by each of the first elector and a second elector, wherein each elector is configured to provide a separate appraisal of the candidate object independently of the other, and based on a different attribute of the candidate object.

20. The computer readable medium of claim 19 further encoded with a computer program to:
apply a first weight to the appraisal provided by the first elector and a second weight to the appraisal provided by the second elector;
combine the weighted appraisals; and
determine whether the combined appraisal identifies the candidate object as being the manipulated object by comparing the combined appraisal to the threshold value;
wherein the first weight represents the value of the first elector for assessing whether the given object is the manipulated object and the second weight represents a value of the second elector for assessing whether the given object is the manipulated object.

* * * * *